Patented June 2, 1925.

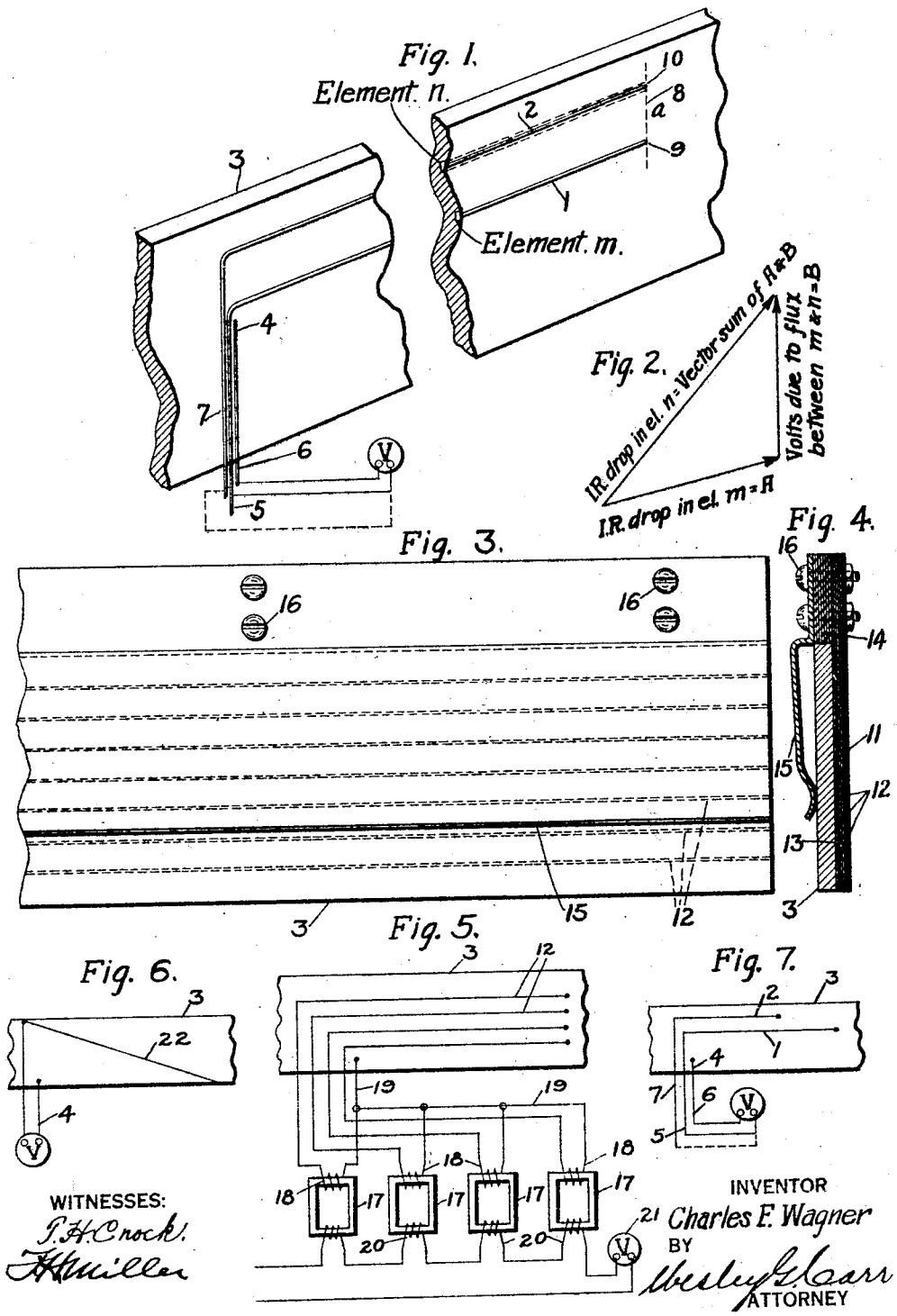

1,539,888

UNITED STATES PATENT OFFICE.

CHARLES F. WAGNER, OF PITTSBURGH, PENNSYLVANIA, ASSIGNOR TO WESTING-HOUSE ELECTRIC & MANUFACTURING COMPANY, A CORPORATION OF PENNSYLVANIA.

METHOD AND MEANS FOR MEASURING CURRENT DISTRIBUTION.

Application filed January 14, 1921. Serial No. 437,329.

*To all whom it may concern:*

Be it known that I, CHARLES F. WAGNER, a citizen of the United States, and a resident of Pittsburgh, in the county of Allegheny and State of Pennsylvania, have invented a new and useful Improvement in Methods and Means for Measuring Current Distribution, of which the following is a specification.

My invention relates to electrical testing and particularly to methods of, and means for, determining current distribution in bus-bars.

One object of my invention is to provide a comparatively simple method of determining certain operating characteristics of a bus-bar or other conductor, from which determination other characteristics may readily be calculated.

Another object of my invention is to provide means for detecting inherent differences between elements of a single conductor.

In the ordinary types of bus-bars and other conductors carrying a varying or an alternating current, the unequal distribution of current that is greatest at the outer surface is a very objectionable feature, from the standpoint of economy of construction and that of operation.

In my copending application Serial No. 412,461, filed Sept. 24, 1920, is disclosed means for overcoming the unequal distribution of current in bus-bars.

My present invention relates to a simple and effective method for determining certain data for use in connection with the design of the devices set forth in the above-mentioned patent application and to a device or means for facilitating the application of the method.

In practicing my invention, I provide a method for so indicating characteristic differences between certain filamentary portions of, or zones in, a single conductor as to facilitate the compilation of data by which the conductor may, in accordance with the disclosure of the above mentioned patent application, be constructed economically and operated effectively.

Figure 1 of the accompanying drawings is a broken perspective view of a portion of a bus-bar with a diagrammatic representation of filamentary exploring conductors, utilized in the method of my invention, operatively connected thereto.

Fig. 2 is a diagram of voltage vectors that are proportioned to the values and phase-angle relations of current in different filamentary elements of the bus-bar.

Fig. 3 is a side elevational view of a portion of an insulating plate or holder, embodying my invention, for facilitating the application of the method.

Fig. 4 is a cross-sectional view of the device shown in Fig. 3.

Figs. 5 and 6 are diagrammatic views of arrangements of conductors and devices for measuring the vector sum of the I. R. drops in the bus-bar and;

Fig. 7 is a diagrammatic view of a modified form of the system shown in Fig. 1.

Referring to Figs. 1 and 2, spaced, filamentary, insulated, exploring conductors 1 and 2, of substantially equal length, are placed in side engagement, throughout their lengths, against the side of, and parallel to, a bus-bar 3 and electrically connected, at the ends 9 and 10 thereof, to the bus-bar. The insulating covering of the conductors 1 and 2 is preferably very thin, such as a coating of enamel, so that the conductors may lie as close as practicable to the bus-bars. This arrangement provides, in effect, non-inductive shunts between the conductors 1 and 2 and adjacent elements $m$ and $n$, respectively, in the bus-bar and indicated, in cross section, as rectangles and, longitudinally, by dotted lines. Another exploring conductor 4 is connected to the bar 3 adjacent to the opposite ends of the conductors 1 and 2.

By connecting a volt meter across end portions 5 and 6 of the exploring conductors 1 and 4, respectively, a voltage that is proportional to the resistance drop in the element $m$ will be indicated. Similarly, a voltage proportional to the resistance drop in the element $n$ may be indicated, by placing the voltmeter between the end portion 6 of the conductor 4 and an end portion 7 of the conductor 2. The latter voltage is equal to the vector sum of the resistance drop in element $m$ and the induced voltage caused by the flux between the elements $m$ and $n$. Therefore, to determine the phase relation of voltages in the elements $m$ and $n$, it is only necessary to measure the voltage induced by the flux between the elements *m* and *n*.

The conductors 1 and 2, with a portion 8 of the bus-bar 3 extending between the ends 9 and 10 of the conductors 1 and 2, form a rectangle or loop through which passes the flux to be measured. The indicated voltage drop between the portions 5 and 7 of the conductors 1 and 2, therefore, is that caused by the flux alone.

The three voltage values, i. e., I. R. drop in *n*, I. R. drop in *m* and induced voltage in loop *m*—*n*, found as above described, may be resolved to form a vector triangle, as indicated in Fig. 2, from which the phase relations of the I. R. drops in the elements *m* and *n* may be determined and from these, by simple calculation, the phase relations and magnitudes of current densities in elements *m* and *n*.

By moving the conductors 1 and 2 to various positions on the bus-bar 3, or by providing a greater number of similar conductors, the current distribution in magnitude and phase may be determined for the entire bus-bar.

As shown in Figs. 3 and 4, a simple device for facilitating the above described method comprises an insulating plate 11 having a plurality of filamentary exploring conductors 12 disposed along, or embedded in, one side surface 13 thereof, that are adapted to be placed against the bar 3. The plate 11 has a thickened edge or shoulder portion 14 by which it may be conveniently positioned on the bar 3 and upon which a clip spring 15, for pressing the conductors 12 into close engagement with the bar, is mounted, as by screws 16.

As shown in Fig. 5, a plurality of the exploring conductors 12 may be employed in conjunction with a plurality of transformers 17. Each conductor 12 is connected to one side of the primary winding 18 of one of the transformers 17 there being one transformer for each conductor 12, and the opposite side of each primary winding is connected to a common terminal connector 19, corresponding to the conductor 4 of Fig. 1. Secondary windings 20 are connected in series with each other and with a voltmeter 21. This construction provides a convenient arrangement for electrically isolating the respective pairs of exploring conductors, between which a measurement is being taken, and for obtaining the vector sum of their respective I. R. drops.

A modified form of the system illustrated in Fig. 5, is shown in Fig. 6, in which a voltmeter is connected between an exploring conductor 22, extending diagonally along one side of the bus-bar 3, and the conductor 4. This arrangement, while permitting an indication of the sum of the I. R. drops in the various elements of the bar, does not isolate the voltmeter from the bar, as in the above described form.

A modified form of the system illustrated in Fig. 1, is shown in Fig. 7, in which one of the exploring conductors 1 and 2 may be longer than the other. While the system of Fig. 1 is to be preferred, the system of Fig. 7 may function similarly with a correction, in the calculations, for the difference in length of the exploring conductors 1 and 2.

While I have shown and described my novel method and means for determining current distribution in conductors, it is to be understood that various changes, both as to method and means, may be effected within the spirit and scope of the appended claims.

I claim as my invention:

1. The method of determining current-distribution characteristics of a main conductor which consists in electrically connecting a plurality of auxiliary conductors to the main conductor, in placing portions of the auxiliary conductors in adjacent insulated relation to the main conductor and indicating the effects caused by energization of the main conductor between the auxiliary conductors.

2. The method of determining characteristics of a main conductor which consists in electrically connecting a plurality of elongated auxiliary conductors to the main conductor, in placing portions of the auxiliary conductors in insulated side-surface relation to the main conductor while the latter is electrically energized and indicating the effects between the auxiliary conductors.

3. The method of determining characteristics of a main conductor which consists in electrically connecting a plurality of filamentary conductors to the main conductor, in placing portions of the auxiliary conductors in adjacent insulated relation to the main conductor in conformity to the current stream lines of the latter and indicating the effect caused by energization of the main conductor between the filamentary conductors.

4. The method of determining characteristics of a main conductor which consists in electrically connecting a plurality of filamentary conductors to the main conductor, in placing portions of the auxiliary conductors in insulated side-surface relation to the main conductor in conformity to the current stream lines of the latter and indicating the effects caused by energization of the main conductor between the filamentary conductors.

5. The method of determining characteristics of a main conductor which consists in electrically connecting a plurality of spaced parallel filamentary conductors to the main conductor, in placing portions of the auxiliary conductors in insulated side-surface relation to the main conductor parallel to the latter and indicating the effects caused between the filamentary conductors by energization of the main conductors.

6. The method of determining characteristics of a main conductor which consists in electrically connecting an auxiliary conductor to the main conductor, in electrically connecting an elongated auxiliary conductor to the main conductor and extending the same along a surface of the main conductor in insulated relation thereto and indicating the effects caused by energization of the main conductor between the auxiliary conductors.

7. The method of determining characteristics of a main conductor subject to a predetermined applied potential which consists in electrically connecting auxiliary testing-conductor means thereto, in placing portions of said means adjacent to the main conductor in insulated relation thereto and indicating the effects caused by differences in induced potential between different parts of the main conductor.

8. Means for determining current-distribution characteristics of a main conductor comprising a plurality of exploring conductors for electrical connection thereto and having portions for positioning adjacent to the main conductor in insulated relation thereto and indicating means for operative connection to said exploring conductors.

9. In a device for determining characteristics of a main conductor, the combination with indicating means, of a supporting structure, a plurality of spaced filamentary conductors supported on said structure for electrical connection to the main conductor and having insulated portions for position along the surface of the main conductor, and means for operatively connecting the filamentary conductors to the indicating means.

10. In a device for determining characteristics of a main conductor, the combination with indicating means, of a supporting structure, a plurality of spaced filamentary conductors supported on said structure, means for mounting said structure on the main conductor with the filamentary conductors electrically connected thereto but having portions insulated therefrom, and means for operatively connecting the filamentary conductors to the indicating means.

11. In a device for determining current distribution in a bus-bar, the combination with indicating means, of an insulating supporting plate, a plurality of spaced filamentary conductors, disposed along a side surface of the plate, means for mounting the plate on the bar and pressing the filamentary conductors against the same in contact therewith at certain points and insulated therefrom at other points, and terminal means for operatively connecting the filamentary conductors to the indicating means.

12. Means for determining current distribution characteristics of a main conductor comprising a plurality of insulated exploring conductors electrically connected to the main conductor and disposed in predetermined position adjacent to the main conductor, an indicating device and means operatively connected between the exploring conductor and the indicating device.

13. Means for determining current distribution characteristics of a main conductor comprising a plurality of local exploring circuits responsive to voltage differences in different parts of the main conductor and means for indicating the vector sum of all of said voltage differences.

14. Means for determining current distribution characteristics of a main conductor comprising a plurality of local exploring circuits responsive to voltage differences in different parts of the main conductor, means for indicating the vector sum of all of said voltage differences and means for operatively connecting and insulating said indicating means with respect to said exploring circuits.

In testimony whereof, I have hereunto subscribed my name this 5th day of January 1921.

CHARLES F. WAGNER.